Jan. 19, 1965   J. FURMAN   3,166,696
VIBRATING CAPACITOR
Filed July 12, 1961
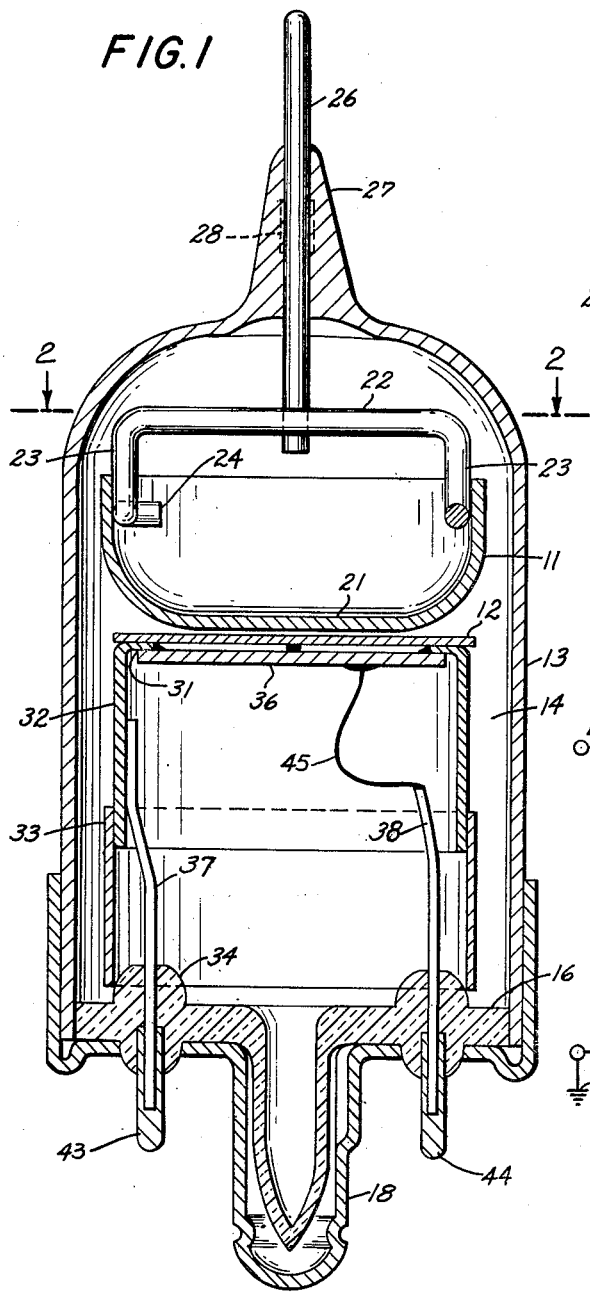
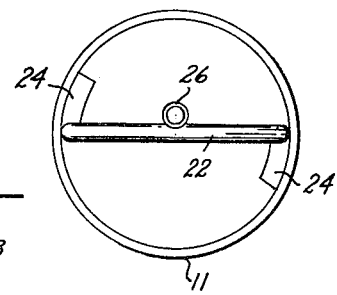
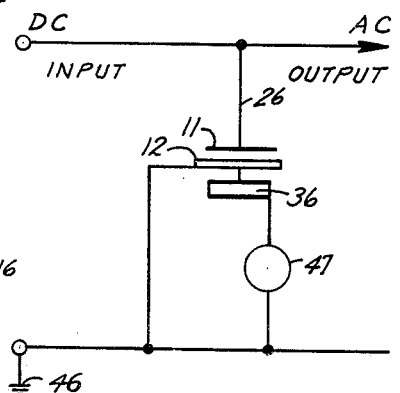
INVENTOR.
JACOB FURMAN
BY
ATTORNEY

United States Patent Office 3,166,696
Patented Jan. 19, 1965

3,166,696
VIBRATING CAPACITOR
Jacob Furman, Newark, N.J., assignor, by mesne assignments, to Electronic Automation Systems, Inc., a corporation of New York
Filed July 12, 1961, Ser. No. 123,516
4 Claims. (Cl. 317—250)

This invention relates to a vibrating capacitor and more particularly to a vibrating capacitor utilizing an electrostrictive element as the electromechanical driver.

Vibrating capacitors are devices capable of converting a direct current signal into an alternating current signal having a magnitude proportional to the magnitude of the direct current signal. Vibrating capacitors are extremely valuable in measuring instruments used for measuring very small D.C. currents and voltages from very high impedance sources because there has been found no economical way of measuring minute D.C. voltages and currents at the level of $10^{-15}$ volts or amps directly.

When such measurements are made it is first necessary to amplify the signal sought to be measured by means of a D.C. amplifier. Currently no D.C. amplifiers are available which can increase the amplitude of these signals to a measurable level without introducing constant drift which is inherent in D.C. amplifiers and thus inaccuracy of measurement. However, by converting these minute D.C. signals into alternating current signals the A.C. signals can be readily amplified using available equipment to measurable levels without introducing the limitation of drifts inherent in D.C. amplifiers. Thus vibrating capacitors can be utilized in a number of measurement applications.

For instance, utilized with other suitable equipment the vibrating capacitor may be employed to measure the extremely small potentials of floating grids in vacuum tubes, the insulation leakage currents of conductors, capacitor and dielectric leakage. In the nuclear field the vibrating capacitor may be used in combination with ionization chambers to make precise measurement of all types of nuclear radiation. In the fields of physics and chemistry, the vibrating capacitor can be used in the determination of pH in mass spectrometry while in biophysics and medicine it may be used to measure cell and skin potentials, nerve impulses and many other applications. Thus the vibrating capacitor is an extremely useful device.

Although vibrating capacitors are known, present day vibrating capacitors are limited in their application. The principle of operation of vibrating capacitors is rather simple in theory but it has been very difficult to achieve particularly in those applications where it is necessary to convert a D.C. voltage of a magnitude of $10^{-15}$ volts into an A.C. voltage of proportional magnitude.

In operation the D.C. voltage or electrostatic charge to be measured is applied to a fixed plate of a capacitor having both a fixed and movable plate or electrode. By constantly and uniformly moving the movable electrode with respect to the fixed electrode at a constant frequency the electrostatic charge or D.C. voltage applied to the electrode is converted into an A.C. voltage of a frequency corresponding to the frequency of vibration or movement of the movable electrode.

The spacing between the respective electrodes for the purpose of accommodating the deformed electrode is very critical. Furthermore, it can be shown that the conversion efficiency of the vibrating capacitor in converting the D.C. voltage into an A.C. voltage is dependent upon the frequency of vibration or oscillation of the movable electrode with respect to the fixed electrode. Thus it is necessary that the movable electrode not only be uniformly and constantly moved with respect to the fixed electrode but it must be vibrated or oscillated at relatively high frequencies if efficient operation is to be achieved. This is particularly demanding where D.C. voltages of the level of $10^{-15}$ volts are to be measured.

Conventional vibrating capacitors employ an electromagnetically driven vibrating reed or diaphragm as the movable electrode. In present day vibrating capacitors the movable electrode which is formed of a magnetic material is moved by an alternating magnetic field created by energizing an electrical coil surrounding a magnetic core. The frequency of vibration of the movable electrode is determined by the frequency of the voltage used to energize the electrical coil. This is limited to low frequency operation (1000 c.p.s.).

Because of inherent limitations, electromagnetic drive means of this type are limited in application. The use of electromagnetic drive means imposes a definite limitation in the frequency at which the movable electrode can be vibrated. Since the conversion efficiency of vibrating capacitors is a function of the frequency of vibration, the higher the frequency of vibration, the higher the conversion efficiency. Conventional electromagnetic drive means are poor in this respect.

There are other objections to conventional vibrating capacitors. Because they employ electromagnetic drive means for vibrating the movable electrode. They are bulky in size and inefficient in operation. Also the practical mechanical problems of vibrating a reed or diaphragm at relatively high frequencies by means of an electromagnetic drive means as presently used today are difficult if not impossible to overcome. This is certainly true where it is necessary to convert minute D.C. voltages of the level of $10^{-15}$ volts into A.C. voltages.

Therefore, it is an object of this invention to provide a vibrating capacitor capable of converting small D.C. signals into alternating current signals at a very high conversion efficiency.

Another object of this invention is to provide an electrostrictive vibrating capacitor in which a movable electrode is vibrated at a frequency of 1 kilocycle to 5 megacycles.

Still another object of this invention is to provide a vacuum tube type electrostrictive vibrating capacitor of a smaller size than conventional electromagnetic vibrating capacitors.

Still another object of this invention is to provide an electrostrictive vibrating capacitor for converting D.C. signals to A.C. signals with a minimum of drift in the A.C. signal.

Apparatus for accomplishing these and many other objects in accordance with the principles of my invention may include in general a fixed electrode and a movable electrode rigidly supported and spaced from one another. An electrostrictive ceramic or crystal element is connected to the movable electrode and vibrates it in a flexural mode. A connector is provided for applying a D.C. voltage or current signal to the fixed electrode and also for bringing out the A.C. signal.

The entire assembly is mounted in a vacuum in a glass envelope and connector pins are provided for connecting the electrostrictive vibrating capacitor as a small compact unit into a conventional electron tube socket.

A more complete understanding of the invention can be had by reference to the following description when taken in view of the accompanying drawings wherein:

FIG. 1 is a cross-sectional view of my invention illustrating the manner in which a fixed electrode and a movable electrode are supported in a vacuum, and illustrating the electrotrictive drive means for vibrating the movable electrode with respect to the fixed electrode;

FIG. 2 is a cross-sectional view taken along the line 2—2 of FIG. 1 illustrating the fixed electrode in greater detail and;

FIG. 3 is a schematic view illustrating the electrical circuit of my invention.

Referring now to FIG. 1 my invention is shown as comprising a dish shaped fixed electrode 11 and a movable electrode 12 rigidly supported and spaced from one another in a sealed envelope 13 of glass or the like. The envelope 13 is sealed by a lock-in stem 16 fuzed into position and a base 18 cemented to the envelope 13. The envelope may be evacuated and filled with an inert gas such as argon before sealing.

Referring to FIGS. 1 and 2, the fixed electrode 11 is cylindrical and dish shaped with a substantially flat bottom surface 21. The shape of the electrode 11 greatly simplifies its construction and permits the fixed electrode 11 to be rigidly supported within the envelope 13 with a minimum of support elements.

The fixed electrode 11 is formed of brass, nickel or like material, electroplated and vapor deposited with gold. A cross conductor 22 formed of tungsten or the like extends diametrically across the cylindrical fixed electrode 11 substantially parallel to the flat bottom portion 21. End portions 23 of the cross conductor 22 are downturned and extend into the dish shaped electrode 11. The downturned end portions 23 of the cross conductor 22 engage and are rigidly secured to the sidewalls of the dish shaped electrode 11. Within the dish-shaped electrode 11 the free ends 24 of the cross wire 22 are arcuately formed to coincide with the periphery of the inner surface of the fixed electrode 11 so as to provide a maximum contact surface area between the cross conductors 22 and the fixed electrode 11.

The end portions 23 and the arcuate portions 24 are secured to the side walls of the fixed electrode 11 by spot welds to assure good electrical contact between the cross conductor support and the fixed electrode.

A center conductor 26 of tungsten or the like is spot welded to the cross support 22 at its center and extends through an enlarged end portion 27 of the glass envelope 13. To improve the stability of the fixed electrode 11 the center conductor 26 also extends through a glass bead 28 within the enlarged end portion 27 of the envelope 11.

By this construction the center conductor 26 and the cross conductor 22 provide the necessary electrical connections and rigid support for the fixed electrode 11 within the envelope 13. Because of the downturned end portions 23 and the arcuate portions 24 of the conductor 22 a large electrical contact surface is provided between the fixed electrode and the cross wire. This relatively large contact surface area permits the cross conductor 22 to be rigidly spot welded to the fixed electrode and provide for a solid mounting of the fixed electrode. In addition this symmetrical arrangement produces a construction which can withstand heavy shock and vibration.

The movable electrode 12 is a flat, round disc formed of tough, flexible beryllium-copper or the like that has been electroplated and vapor deposited with gold. The outer annular portion of the movable electrode 12 is secured to the inturned edge 31 of a cylindrical mounting 32 formed of brass, nickel or the like. The movable electrode 12 may be secured to the mounting 32 by means of soldering or the like.

The mounting 32 is spot welded to a cylindrical shield 33 formed of brass or the like. This assembly is supported in the envelope 13 upon a plurality of rigid conductors 37 spot welded to the mounting 32. The rigid conductors 37 terminate in connector pins 43 extending from the stem 16 and through the base 18. Only one rigid conductor 37 and pin 43 is shown for the purpose of clarity. However, a number of such rigid conductors 37 may be employed and are desirable to firmly support the mounting 32 in the envelope 13. In addition a single rigid conductor 38 is supported in the envelope 13 and terminates in connector pin 44 extending through the base 18. For example in using a standard 8-pin octal base, 7 pins are connected to rigid conductors 37 and one pin to rigid conductor 38.

A substantially flat cylindrical transducer 36 formed of titanate ceramic or piezoelectric material having suitable electrostrictive transducer characteristics is soldered at its edges to the bottom surface of the inturned edge 31 of the cylindrical mounting 32. Transducer 36 is electrically connected to the rigid conductor by means of lead 45. The transducer 36 and the movable electrode 12 are soldered at their midpoints and mechanically coupled together.

In operation and as shown in FIG. 3 all the connector pins 43 are connected to ground 46 and maintained at ground potential. Thus the upper surface of the transducer 36, the movable electrode 12, the mounting 32 and the shield 33 are all maintained at ground potential to shield the fixed electrode 11 from the transducer 36, and the connector pin 44 is connected to the output of a variable frequency A.C. generator 47.

*Description of operation*

Referring now to FIGS. 1 and 3 it is seen that the D.C. input voltage to be measured is applied across the fixed and movable leectrodes 11 and 12. This condition is expressed as:

$$Q = CV \tag{1}$$

where $Q$ = charge; $V$ = voltage across the capacitor; and $C$ = the capacitance between the fixed and movable electrodes. It can be seen that for a constant $Q$, $V$ varies inversely with $C$ and thus a variable $V$ is produced when $C$ is varied, since the static capacitance between the two electrodes is an inverse function of the distance between them. Variation of $C$ is accomplished by vibrating the movable electrode 12 with respect to the fixed electrode 11.

Vibration of the movable electrode 12 is obtained by driving the transducer 36 by means of the variable frequency A.C. generator 47. Preferably the frequency of the A.C. signal applied to the transducer 36 is the resonant frequency of the transducer and is determined by the physical configuration and other properties of the transducer. As the properties of ceramic transducer elements are well known they need not be discussed in detail. It is sufficient to say that such elements can be made to vibrate in a flexural mode at frequencies between 1 kc. and 5 mc. depending upon the type and physical configuration of the ceramic element employed.

As the ceramic element 36 vibrates in resonance with the sinusoidal drive voltage applied, the flexible, movable electrode 12 vibrates in unison therewith.

As the movable electrode 12 vibrates in a flexural mode the distance and thus the capacitance between the movable electrode 12 and the fixed electrode 11 is varied and produces an alternating voltage output of a frequency corresponding to the frequency of the alternating current drive voltage from the A.C. generator 47.

With a given drive frequency the conversion efficiency for a vibrating capacitor is as follows:

$$\text{Percent efficiency} = \frac{E_{RMS} \text{ (output)}}{E_{DC} \text{ (input)}} \tag{2}$$

Where $E_{RMS}$ = the root mean square value of the alternating voltage output; $E_{DC}$ = D.C. voltage across the capacitor.

When the charge $Q$ across the capacitor is maintained constant and the capacitance $C$ is changed by $dc$, the voltage across the capacitor changes by $dv$.

From Equation 1

$$V = \frac{Q}{C}$$

$$\frac{dv}{dc} = \frac{-Q}{C^2} = -\frac{V}{C} \tag{3}$$

or $$dv = \frac{-Q}{C^2}dc = \frac{-V}{C}dc \qquad (4)$$

Thus the change in voltage is a function of Q, C and $dc$. C varies periodically as $$C = C_0 \sin wt \qquad (5)$$

where $C_0$ is the quiescent value of the capacity C and $$dc = WC_0 \cos wt = 2\pi f C_0 \cos wt \qquad (6)$$

Consequently the magnitude of the varying voltage and thus the conversion efficiency is a function of the frequency $f$.

Therefore it is obvious that the conversion efficiency of a vibrating capacitor increases with an increase in the frequency of the drive voltage. By using an electrostrictive drive means for vibrating the movable electrode 12 extremely high frequencies of vibration of up to 5 megacycles are achieved. This greatly increases the efficiency and operational range of vibrating capacitors.

The use of the electrostrictive transducer 36 as the drive means provides for extremely stable oscillation and vibration of the movable electrode and greatly reduces the problems of drift caused by frequency variations induced in conventional drive means. By eliminating drift a stable, undistorted, sinusoidal waveform is obtained at the output. Also, mounting the entire assembly in a vacuum in accordance with my invention protects the device from environmental variation and thus also reduces the amount of drift caused by environmental changes.

Drifts in the contact potential between the fixed movable electrodes of a vibrating capacitor are definite limitations on its sensitivity and stability. In my invention contact potential variation and the ensuing drift effect is eliminated by coating the fixed and movable electrodes with a surface layer of gold. This is preferably accomplished by first electroplating a coating of gold and then vapor depositing a final surface layer of gold on the surfaces of the fixed and movable electrodes 11 and 12, respectively. The fixed electrode 21 is also shielded from the transducer 36 to improve the operation.

Although I have described my invention in detail in the embodiment illustrated in the drawing and described above, it is not intended to limit my invention thereto. Persons skilled in the art will find many applications of my invention as defined in the appended claims.

I claim:

1. A device for converting a D.C. signal into an A.C. signal which comprises: a sealed envelope including a base cemented thereto and connector pins extending therefrom; a dish shaped fixed electrode having a flat bottom surface mounted in said envelope; cylindrical mounting means supported in said envelope; a flat, cylindrical movable electrode secured at its edges to said cylindrical mounting means; an electrostrictive ceramic element secured to said mounting means and spaced from said movable electrode, said movable electrode and said ceramic element being mechanically interconnected at their midpoints; circuit means for connecting said ceramic element and said movable electrode to said connector pins; and means for driving said ceramic element within the frequency range of 1 kc. to 5 mc. to vibrate said ceramic element in a flexural mode within said frequency range whereby said D.C. voltage is converted to an A.C. voltage of a frequency corresponding to the frequency of said drive voltage.

2. Apparatus as defined in claim 1 wherein said fixed electrode is supported in a sealed envelope having an enlarged end portion by means of a center conductor secured to a cross conductor fastened at both ends to said dish shaped electrode, said center conductor extending through and attached to said enlarged end portion of said envelope.

3. In a vibrating capacitor for converting an electrostatic charge into an alternating voltage and including a fixed electrode, and a movable electrode supported in a sealed envelope having a base and connector pins extending therefrom; means for supporting and moving said movable electrode with respect to said fixed electrode comprising: a mounting; a movable electrode secured to said mounting; means for supporting and shielding said movable electrode from said fixed electrode including a plurality of spaced, rigid conductors secured to said mounting, said rigid conductors extending substantially perpendicular to said base and terminating in said connector pins; electrostrictive transducer means secured to said mounting and mechanically coupled to said movable electrode, means for vibrating transducer means in a flexural mode at frequencies between 1 kc. and 1 mc. whereby said movable electrode is vibrated with respect to said fixed electrode at a corresponding frequency converting said electrostatic charge into an A.C. voltage, said rigid conductors being maintained at ground potential whereby said fixed electrode is shielded from said transducer means.

4. A vibrating capacitor for converting minute D.C. voltages into A.C. voltages comprising: a sealed cylindrical envelope having a base and connector pins extending therefrom; a dish shaped fixed electrode supported within said envelope; a cylindrical hollow mounting supported within and extending along the long axis of said envelope, said mounting having an inturned edge at an end adjacent and spaced from said fixed electrode; a flat cylindrical movable electrode secured to the outer surface of said inturned edge whereby said movable electrode is spaced from said fixed electrode; an electrostrictive transducer secured to the inner surface of said inturned edge and mechanically coupled to said movable electrode; means for electrically shielding said fixed electrode from said transducer; and means for driving said transducer to vibrate said movable electrode in a flexural mode at frequencies between 1 kilocycle and 5 megacycles, whereby D.C. voltages applied across said fixed electrode and said movable electrode are converted to A.C. voltages of a frequency corresponding to said frequency at which said movable electrode is vibrated.

References Cited in the file of this patent

UNITED STATES PATENTS

| 2,980,841 | Bearinger et al. | Apr. 18, 1961 |
| 3,015,764 | Young | Jan. 2, 1962 |